United States Patent
Zhu et al.

(10) Patent No.: US 11,662,825 B1
(45) Date of Patent: May 30, 2023

(54) LEG-BASED WEARABLE SYSTEM WITH PROPELLER-BASED FORCE FEEDBACK FOR WALKING IN FLUIDS IN VR

(71) Applicant: City University of Hong Kong, Hong Kong (HK)

(72) Inventors: Kening Zhu, Hong Kong (HK); Pingchuan Ke, Hong Kong (HK); Shaoyu Cai, Hong Kong (HK); Haichen Gao, Zhengzhou (CN)

(73) Assignee: City University of Hong Kong, Hong Kong (HK)

( * ) Notice: Subject to any disclaimer, the term of this patent is extended or adjusted under 35 U.S.C. 154(b) by 0 days.

(21) Appl. No.: 17/860,116

(22) Filed: Jul. 8, 2022

(51) Int. Cl.
*G06F 3/01* (2006.01)
*F04D 27/00* (2006.01)
*F04D 25/06* (2006.01)
*F04D 25/16* (2006.01)
*F04D 19/00* (2006.01)

(52) U.S. Cl.
CPC ........... *G06F 3/016* (2013.01); *F04D 19/002* (2013.01); *F04D 25/06* (2013.01); *F04D 25/166* (2013.01); *F04D 27/004* (2013.01); *G06F 3/011* (2013.01)

(58) Field of Classification Search
None
See application file for complete search history.

(56) References Cited

U.S. PATENT DOCUMENTS

2020/0339258 A1\* 10/2020 McLean ................ G06T 19/006

OTHER PUBLICATIONS

Pingchuan KE et al., "Weighted Walking: Propeller-based On-leg Force Simulation of Walking in Fluid Materials in VR", SA '21 Emerging Technologies:, Dec. 14-17, 2021, Tokyo, Japan.
M. Abdullah, M. Kim, W. Hassan, Y. Kuroda, and S. Jeon. Hapticdrone: An encountered-type kinesthetic haptic interface with controllable force feedback: Example of stiffness and weight rendering. In 2018 IEEE Haptics Symposium (HAPTICS), pp. 334-339. IEEE, 2018.
P. Abtahi, B. Landry, J. Yang, M. Pavone, S. Follmer, and J. A. Landay. Beyond the force: Using quadcopters to appropriate objects and the environment for haptics in virtual reality. In Proceedings of the 2019 CHI Conference on Human Factors in Computing Systems, pp. 1-13, 2019.
(Continued)

*Primary Examiner* — Krishna P Neupane
(74) *Attorney, Agent, or Firm* — Idea Intellectual Limited; Margaret A. Burke; Sam T. Yip

(57) ABSTRACT

The present invention provides a device and a system for simulating the buoyancy and the resistive force. The system comprises a pair of wearable devices, each of the wearable devices comprises a calf shell, a first ducted fan, a second ducted fan, a first connection component, a second connection component and a tracker. The first ducted fan and the second ducted fan operate in non-zero duty cycles for generating a first force in a first direction, and a second force in a second direction. The first direction and the second direction are in different directions. The sum of the first force and the second force are the sum of the resistive force, the buoyant force, the potential weights and the weight of the wearable device. The tracker further transmits feedback data to control system.

20 Claims, 5 Drawing Sheets

(56) References Cited

OTHER PUBLICATIONS

S. K. Banala, S. K. Agrawal, and J. P. Scholz. Active leg exoskeleton (alex) for gait rehabilitation of motor-impaired patients. In 2007 IEEE 10th inter national conference on rehabilitation robotics, pp. 401-407. IEEE, 2007.
S. Cai, P. Ke, T. Narumi, and K. Zhu. Thermairglove: A pneumatic glove for thermal perception and material identification in virtual reality. In 2020 IEEE Conference on Virtual Reality and 3D User Interfaces (VR), pp. 248-257. IEEE, 2020.
H. Dreyfuss et al. The measure of man: human factors in design. Whitney Library of Design New York, 1967.
R. Drillis, R. Contini, and M. Bluestein. Body segment parameters. Artificial limbs, 8(1):44-66, 1964.
D. S. Elvitigala, J. Huber, and S. Nanayakkara. Augmented foot: A comprehensive survey of augmented foot interfaces in Augmented Humans Conference 2021, pp. 228-239, 2021.
C. Fang, Y. Zhang, M. Dworman, and C. Harrison. Wireality: Enabling complex tangible geometries in virtual reality with worn multi-strin haptics. In Proceedings of the 2020 CHI Conference on Human Factors in Computing Systems, pp. 1-10, 2020.
D.M. Green, J. A. Swets, et al. Signal detection theory and psychophysics, vol. 1. Wiley New York, 1966.
S. G. Hart. Nasa-task load index (nasa-tlx); 20 years later. In Proceedings of the human factors and ergonomics society annual meeting, vol. 50, pp. 904-908. Sage publications Sage CA: Los Angeles, CA, 2006.
S. Heo, C. Chung, G. Lee, and D.Wigdor. Thor's hammer: An ungrounded force feedback device utilizing propeller-induced propulsive force. In Proceedings of the 2018 CHI Conference on Human Factors in Computing Systems, pp. 1-11, 2018.
K. Homma, O. Fukuda, J. Sugawara, Y. Nagata, and M. Usuba. A wire-driven leg rehabilitation system: Development of a 4-dof experimental system. In Proceedings 2003 IEEE/ASME International Conference on Advanced Intelligent Mechatronics (AIM2003), vol. 2, pp. 908-913. IEEE, 2003.
M. Hoppe, D. Oskina, A. Schmidt, and T. Kosch. Odin's helmet: A head-worn haptic feedback device to simulate g-forces on the human body in virtual reality. Proceedings of the ACMon Human-Computer Interaction, 5(EICS):1-15, 2021.
K. Ito, Y. Ban, and S. Warisawa. Alteredwind: Manipulating perceived direction of the wind by cross-modal presentation of visual, audio and wind stimuli. In SIGGRAPH Asia 2019 Emerging Technologies, pp. 3-4. 2019.
K. Ito, Y. Ban, and S.Warisawa. Manipulation of the perceived direction of wind by cross-modal effects of wind and three-dimensional sound. In 2019 IEEEWorld Haptics Conference (WHC), pp. 622-627. IEEE, 2019.
H. Iwata, H. Yano, and F. Nakaizumi. Gait master: A versatile locomotion interface for uneven virtual terrain. In Proceedings IEEE Virtual Reality 2001, pp. 131-137. IEEE, 2001.
S. Je, M. J. Kim, W. Lee, B. Lee, X.-D. Yang, P. Lopes, and A. Bianchi. Aero-plane: A handheld force-feedback device that renders weight motion illusion on a virtual 2d plane. In Proceedings of the 32nd Annual ACM Symposium on User Interface Software and Technology, pp. 763-775, 2019.
S. Je, H. Lim, K. Moon, S.-Y. Teng, J. Brooks, P. Lopes, and A. Bianchi. Elevate: A walkable pin-array for large shapechanging terrains. In Proceedings of the 2021 CHI Conference on Human Factors in Computing Systems, pp. 1-11, 2021.
L. A. Jones and H. Z. Tan. Application of psychophysical techniques to haptic research. IEEE transactions on haptics, 6(3):268-284, 2012.
P.Ke, K.-N.Keng, S. Jiang, S.Cai, Z.Rong, andK. Zhu. Embodied weather: Promoting public understanding of extreme weather through immersive multi-sensory virtual reality. In The 17th International Conference on Virtual-Reality Continuum and its Applications in Industry, pp. 1-2, 2019.

M. Kim, S. Cho, T. Q. Tran, S.-P. Kim, O. Kwon, and J. Han. Scaled jump in gravity-reduced virtual environments. IEEE transactions on visualization and computer graphics, 23(4):1360-1368, 2017.
Y. Kojio, T. Karasawa, K. Kojima, R. Koyama, F. Sugai, S. Nozawa, Y. Kakiuchi, K. Okada, and M. Inaba. Walking control in water considering reaction forces from water for humanoid robots with a waterproof suit. In 2016 IEEE/RSJ International Conference on Intelligent Robots and Systems (IROS), pp. 658-665, 2016. doi: 10.1109/OS.2016.7759123.
B. Kollmeier, R. H. Gilkey, and U. K. Sieben. Adaptive staircase techniques in psychoacoustics: Acomparison of human data and a mathematical model. The Journal of the Acoustical Society of America, 83(5):1852-1862, 1988.
M. R. Leek. Adaptive procedures in psychophysical research. Perception & psychophysics, 63(8):1279-1292, 2001.
H. Levitt. Transformed up-down methods in psychoacoustics. The Journal of the Acoustical society of America, 49 (2B):467-477, 1971.
J. Luo, Y. Li, M. He, Z.Wang, C. Li, D. Liu, J. An, W. Xie, Y. He, W. Xiao, et al. Rehabilitation of total knee arthroplasty by integrating conjoint isometric myodynamia and real-time rotation sensing system. Advanced Science, p. 2105219, 2022.
R. B. Miller. Response time in man-computer conversational transactions. In Proceedings of the Dec. 9-11, 1968, fall joint computer conference, part I, pp. 267-277, 1968.
H. N. T. Miyasato. A new approach for canceling turning motion in the loco-motion interface, atlas. Proc. ASME Dyn. Syst. Control, pp. 405-406, 1999.
N. C. Nilsson, S. Serafin, F. Steinicke, and R. Nordahl. Natural walking in virtual reality: A review. Computers in Entertainment (CIE), 16(2):1-22, 915 2018.
N. Ranasinghe, P. Jain, S. Karwita, D. Tolley, and E. Y.-L. Do. Ambiotherm: Enhancing Sense of Presence in Virtual Reality by Simulating Real-Worid Environmental Conditions, p. 1731-1742. Association for Computing Machinery, New York, NY, USA, 2017.
G. Roston and T. Peurach. A whole body kinesthetic display device for virtual reality applications. In Proceedings of International Conference on Robotics and Automation, vol. 4, pp. 3006-3011 vol. 4, 1997. doi: 10 .1109/ROBOT.1997.606744.
T. Sasaki, R. S. Hartanto, K.-H. Liu, K. Tsuchiya, A. Hiyama, and M. Inami. Leviopole: mid-air haptic interactions using multirotor. In ACM SIGGRAPH 2018 Emerging Technologies, pp. 1-2. 2018.
D. Schmidt, R. Kovacs, V. Mehta, U. Umapathi, S. Köhler, L.-P. Cheng, and P. Baudisch. Level-ups: Motorized stilts that simulate stair steps in virtual reality. In Proceedings of the 33rd Annual ACM Conference on Human Factors in Computing Systems, pp. 2157-2160, 201.
H. Schmidt, S. Hesse, R. Bernhardt, and J. Krüger. Hapticwalker—a novel haptic foot device. ACM Transactions on Applied Perception (TAP), 2(2):166-180, 2005.
S. Serafin, L. Turchet, R. Nordahl, S. Dimitrov, A. Berrezag, and V. Hayward. Identification of virtual grounds using virtual reality haptic shoes and sound synthesis. In Proceedings of the Eurohaptics 2010 Special Symposium: Haptic and Audio Visual Stimuli: Enhancing Experiences and Interaction, pp. 61-70. University of Twente, 2010.
J. Shigeyama, T. Hashimoto, S. Yoshida, T. Narumi, T. Tanikawa, and M. Hirose. Transcalibur: A weight shifting virtual reality controller for 2d shape rendering based on computational perception model. In Proceedings of the 2019 CHI Conference on Human Factors in Computing Systems, pp. 1-11, 2019.
H. Son, I. Hwang, T.-H. Yang, S. Choi, S.-Y. Kim, and J. R. Kim. Realwalk: Haptic shoes using actuated mr fluid for walking in vr. In 2019 IEEEWorld Haptics Conference (WHC), pp. 241-246. IEEE, 2019.
P. Strohmeier, S. Güngör, L. Herres, D. Gudea, B. Fruchard, and J. Steimle. bARefoot: Generating virtual materials using motion coupled vibration in shoes. In Proceedings of the 33rd Annual ACM Symposium on User 950 Interface Software and Technology, pp. 579-593, 2020.
Y. Sun, S. Yoshida, T. Narumi, and M. Hirose. Pacapa: A handheld vr device for rendering size, shape, and stiffness of virtual objects

(56) References Cited

OTHER PUBLICATIONS in tool-based interactions. In Proceedings of the 2019 CHI Conference on Human Factors in Computing Systems, pp. 1-12, 2019.

Y. Takeuchi. Gilded gait: reshaping the urban experience with augmented footsteps. In Proceedings of the 23nd annual ACM symposium on User interface software and technology, pp. 185-188, 2010.

J. N. Templeman, P. S. Denbrook, and L. E. Sibert. Virtual locomotion: Walking in place through virtual environments. Presence, 8(6):598-617, 1999.

S.-Y. Teng, T.-S. Kuo, C.Wang, C.-h. Chiang, D.-Y. Huang, L. Chan, and B.-Y. Chen. Pupop: Pop-up prop on palm for virtual reality. In Proceedings of the 31st Annual ACM Symposium on User Interface Software and Technology, pp. 5-17, 2018.

L. Turchet, P. Burelli, and S. Serafin. Haptic feedback for enhancing realism of walking simulations. IEEE transactions on haptics, 6(1):35-45, 2012.

C.Wang, D.-Y. Huang, S.-W. Hsu, C.-L. Lin, Y.-L. Chiu, C.-E. Hou, and B.-Y. Chen. Gaiters: exploring skin stretch feedback on legs for enhancing virtual reality experiences. In Proceedings of the 2020 CHI Conference on Human Factors in Computing Systems, pp. 1-14, 2020.

T.-H. Wang, T.-S. Lee, J.-P. Pan, T.-Y. Kuo, H.-Y. Yong, and P.-H. Han. GroundFlow: Multiple Flows Feedback for Enhancing Immersive Experience on the Floor in the Wet Scenes. Association for Computing Machinery, New York, NY, USA, 2021.

E.Whitmire, H. Benko, C. Holz, E. Ofek, andM. Sinclair. Haptic revolver: Touch, shear, texture, and shape rendering on a reconfigurable virtual reality controller. In Proceedings of the 2018 CHI Conference on Human Factors in Computing Systems, pp. 1-12, 2018.

B. G.Witmer and M. J. Singer. Measuring presence in virtual environments: A presence questionnaire. Presence, 7 (3):225-240, 1998.

L. Yan, R. S. Allison, and S. K. Rushton. New simple virtual walking method-walking on the spot. In Proceedings of the IPT Symposium, pp. 1-7. Citeseer, 2004.

T.-H. Yang, H. Son, S. Byeon, H. Gil, I. Hwang, G. Jo, S. Choi, S.-Y. Kim, and J. R. Kim. Magnetorheological fluid haptic shoes for walking in vr. IEEE Transactions on Haptics, 14(1):83-94, 2020.

T. Yokota, M. Ohtake, Y. Nishimura, T. Yui, R. Uchikura, and T. Hashida. Snow walking: motion-limiting device that reproduces the experience of walking in deep snow. In Proceedings of the 6th Augmented Human International Conference, pp. 45-48, 2015.

S. Yoshida, Y. Sun, and H. Kuzuoka. Pocopo: Handheld pin-based shape display for haptic rendering in virtual reality. In Proceedings of the 2020 CHI Conference on Human Factors in Computing Systems, pp. 1-13, 2020.

L. Zhao, Y. Liu, and W. Song. Tactile perceptual thresholds of electrovi bration in vr. IEEE Transactions on Visualization and Computer Graphics, 27(5):2618-2626, 2021.

K. Zhu, T. Chen, F. Han, and Y.-S. Wu. HapTwist: creating interactive haptic proxies in virtual reality using low-cost twistable artefacts. In Proceedings of the 2019 CHI Conference on Human Factors in Computing Systems, pp. 1-13, 2019.

PropelWalker: A Leg-based Wearable System with Propeller-based Force Feedback forWalking in Fluids in VR.

\* cited by examiner

LEG-BASED WEARABLE SYSTEM WITH PROPELLER-BASED FORCE FEEDBACK FOR WALKING IN FLUIDS IN VR

FIELD OF THE INVENTION

The present invention generally relates to virtual reality (VR). More specifically, the present invention relates to a pair of calf-worn haptic devices that can be used in conjunction with virtual reality systems.

BACKGROUND OF THE INVENTION

There has been increasing focus on haptic interfaces for virtual reality (VR), to support high-quality touch experience.

Some researchers proposed a large-scale walkable actuated pin array to simulate different ground setups in VR. Some other studies used vibrotactile feedback to simulate the forces generated when people step on different textured grounds. Still some others proposed to use the magnetorheological fluid to simulate the deformation of different materials (especially liquid) when stepping into the mediums and achieved a better result than using vibration.

Though these existing works could provide tactile feedback on the feet, it is still challenging to use these systems to generate large-scale force impact to simulate the real-world walking experience in different liquid mediums.

When we are walking in different mediums in the real world, the legs, another equally important part besides the soles and the feet, is also undertaking the large-scale force feedback (e.g., the resistant and the buoyant forces) during the walking experience in different fluids. It could be common in the real world for us to walk in different fluid mediums and experience different resistant/buoyant forces, but there is a lack of in-depth research on simulating such experience on legs in VR.

To tackle this problem, a pair of calf-worn haptic devices are introduced. The devices are for simulating the buoyancy and the resistive force when the human's lower limbs are interacting with different fluids and materials in VR. With the involvement of haptic feedback on the human's lower limb, the sense of realism and immersion in the virtual environment is improved.

SUMMARY OF THE INVENTION

It is an objective of the present invention to provide a wearable system with a pair of wearable devices for simulating the buoyancy and the resistive force when the human's lower limbs are interacting with different fluids and materials in VR.

In accordance with a first aspect of the present invention, a pair of wearable devices simulate the buoyancy and the resistive force by using ducted fans. Each of the wearable devices simulates the buoyancy and the resistive force by using a pair of ducted fans simultaneously with non-zero duty cycles. The forces generated by the pair of ducted fans are in different directions. Each of the ducted fans is connected to the calf shell through a connection component, and the angle between the ducted fan and the calf shell may be adjusted.

In accordance with one embodiment of the present invention, the angle formed between the ducted fan and the calf shell for at least one of the ducted fans is 0 degree.

In accordance with another embodiment of the present invention, the angle formed between the ducted fan and the calf shell for at least one of the ducted fans is 20 degrees.

In accordance with a second aspect of the present invention, a system for simulating the buoyancy and the resistive force by using ducted fans. The system comprises a pair of wearable devices. Each of the wearable devices simulates the buoyancy and the resistive force by using a pair of ducted fans simultaneously with non-zero duty cycles. The forces generated by the pair of ducted fans are in different directions. Each of the ducted fans is connected to the calf shell through a connection component, and the angle between the ducted fan and the calf shell may be adjusted.

In accordance with one embodiment of the present invention, the angle formed between the ducted fan and the calf shell for at least one of the ducted fans is 0 degree.

In accordance with another embodiment of the present invention, the angle formed between the ducted fan and the calf shell for at least one of the ducted fans is 20 degrees.

BRIEF DESCRIPTION OF THE DRAWINGS

Embodiments of the invention are described in more detail hereinafter with reference to the drawings, in which:

FIG. 4 depicts a connection component in accordance with an embodiment of the present invention;

DETAILED DESCRIPTION

In the following description, devices and systems of the virtual reality systems and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In accordance with one embodiment of the present invention, a pair of wearable devices is disclosed. When the human's lower limbs are interacting with different fluids and materials in VR, each wearable device of the wearable devices simulates the buoyancy and the resistive force simultaneously by using a pair of ducted fans.

In accordance with a first aspect of the present invention, a wearable device may include a calf shell, a first connection component, a second connection component, a first ducted fan, a second ducted fan, and a tracker.

In accordance with one embodiment of the present invention, a ducted fan is an assembly comprised of a protection component, a motor, a ducted component and a bladed propeller.

In accordance with one embodiment of the present invention, the control system and the wearable system.

In accordance with another embodiment of the present invention, a connection component comprises a first assembly and a second assembly. The first assembly and the second assembly are primarily coupled together by a screw nut, a pair of spring washers and a pair of screws through the threads of the first and second plates of the first assembly, and the first and second plates of the second assembly.

In accordance with another embodiment of the present invention, a pair of wearable devices are to be worn on the left side and the right side of the legs.

Figure 1:
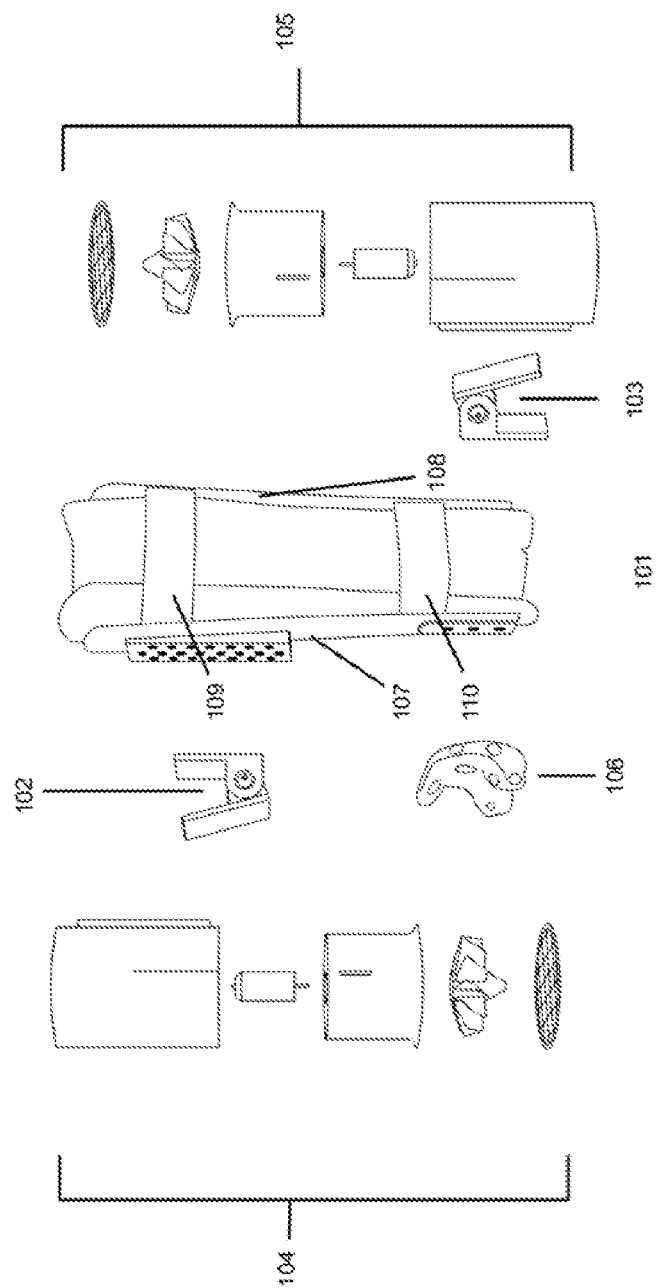
FIG. 1 depicts a wearable device in accordance with an embodiment of the present invention.

A calf-worn haptic system comprises a pair of wearable devices, each of the wearable devices appearing as illustrated in wearable device 100 in FIG. 1, and to be worn on each side of the legs.

FIG. 1 illustrates the breakdown of a wearable device in accordance with an embodiment of the present invention. Wearable device 100 may include a calf shell, such as calf shell 101, a first connection component 103, a second connection component 102, a first ducted fan 105, a second ducted fan 104, and a tracker 106. Wearable device 100 is a haptic device that may be worn on the calf.

Calf shell 101 comprises first panel 107 and second panel 108. The lower rear region of first panel 107 and second panel 108 are connected together by using at least one screw, and the upper rear region of first panel 107 and second panel 108 are spaced apart by a frontal opening. A third panel (not shown in FIG. 1) is placed on the part of the frontal opening, and is connected to the upper rear region of first panel 107 and second panel 108 respectively by using at least one screw. By connecting the first panel, the second panel and the third panel together, a semi-rigid or rigid shell is formed, i.e., calf shell 101. At least one of the first panel and a second panel further comprises a first external thread part and a second external thread part for connecting the connection component and the tracker respectively. The first external thread part and the second external thread part include a plurality of threads respectively.

For illustrative purposes, both the first panel and the second panel further comprise a first external thread part and a second external thread part.

No matter whether wearable device 100 is to be worn on the left side or the right side of the legs, first ducted fan 105 has mechanically or magnetically connected to the third panel through first connection component 103 and generates an upward force.

Wearable device 100 is to be worn on the left side or the right side of the legs may affect which first external thread part that second ducted fan 104 may connect to. Second ducted fan 104 has mechanically or magnetically connected to one of the first external thread parts of the first panel or the second panel through second connection component 102 for generating a downward force.

For example, if wearable device 100 is to be worn on the right side of the legs, second ducted fan 104 is connected to the first external thread part of first panel 107 through second connection component 102. If wearable device 100 is to be worn on the left side of the legs, second ducted fan 104 is connected to the first external thread part of second panel 108 through second connection component 102.

Wearable device 100 may further comprise an inner lining inside calf shell 101 for protection and a better user experience. The inner lining is configured and arranged to fit within the calf shell cavity. The material of the inner lining may be elastomeric material, such as thermosetting plastic or thermoplastic elastomer (TPE). There is no limitation on the material of the inner lining, TPE is only a material for illustrative purposes.

In one variant, the surface of the inner lining further contains clearance holes for better heat dissipation.

In another variant, wearable device 100 further comprises at least one strap. When wearable device 100 is to be worn on one leg calf, the calf shell is configured to be attached to the leg calf, and the size of the calf shell may be adjusted by adjusting the tightness of the at least one strap. For illustrative purposes, upper strap 109 and lower strap 110 are provided to secure the calf shell around a user's lower leg calf.

In one embodiment, the at least one strap is elastic. The size of the calf shell may be automatically adjusted when wearable device 100 is to be worn on one leg calf.

In another embodiment, the at least one strap is inelastic. The size of the calf shell may be manually adjusted by a mechanical method, such as using a hook and loop fastener or a hook-fastener end piece.

Figure 2:
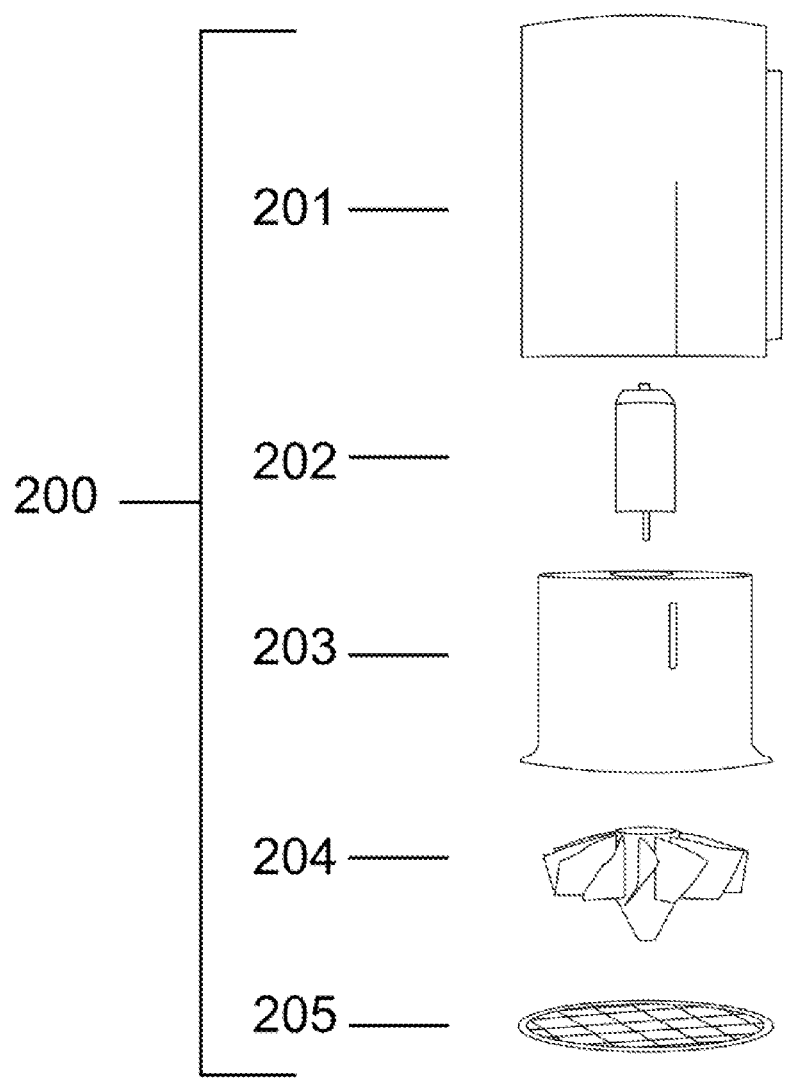
FIG. 2 depicts a ducted fan in accordance with an embodiment of the present invention.

FIG. 2 illustrates a ducted fan in accordance with the embodiments of the present invention. Ducted fan 200 comprises protection component 201, motor 202, ducted component 203 and bladed propeller 204. Motor 202 is coupled with a fixed or variable bladed propeller 204 coaxially mounted inside ducted component 203 and further housed in protection component 201. The power of motor 202 is provided by an external DC power source, such as a DC power supply or battery(s), and the amount of power provided is controlled by the speed controller.

In one embodiment, bladed propeller 204 may be a 12-blade propeller.

In one embodiment, motor 202 may be a brushless motor. More specifically, the brushless motor is a high power brushless direct current (DC) motor.

In one variant, a carbon fiber shield, such as filter lid 205 shown in FIG. 2, is further installed on the top of ducted fan 200 to prevent external objects from contacting blade propeller 204.

Tracker 106 may be mechanically or magnetically mounted or connected to one of the second external thread parts of the first panel and a second panel. Wearable device 100 to be worn on the left side and the right side of the legs may affect may also affect which second external thread parts that tracker 106 may connect to. If wearable device 100 is to be worn on the right side of the legs, tracker 106 is connected to the second external thread parts of first panel 107 through second connection component 102. If wearable device 100 is to be worn on the left side of the legs, tracker 106 is connected to the second external thread parts of second panel 108 through second connection component 102.

In one example, tracker 106 may be a tracker powered by HTC VIVE™.

In one variant, tracker 106 may be excluded from wearable device 100, and directly coupled to the leg calf in any method.

Figure 3:
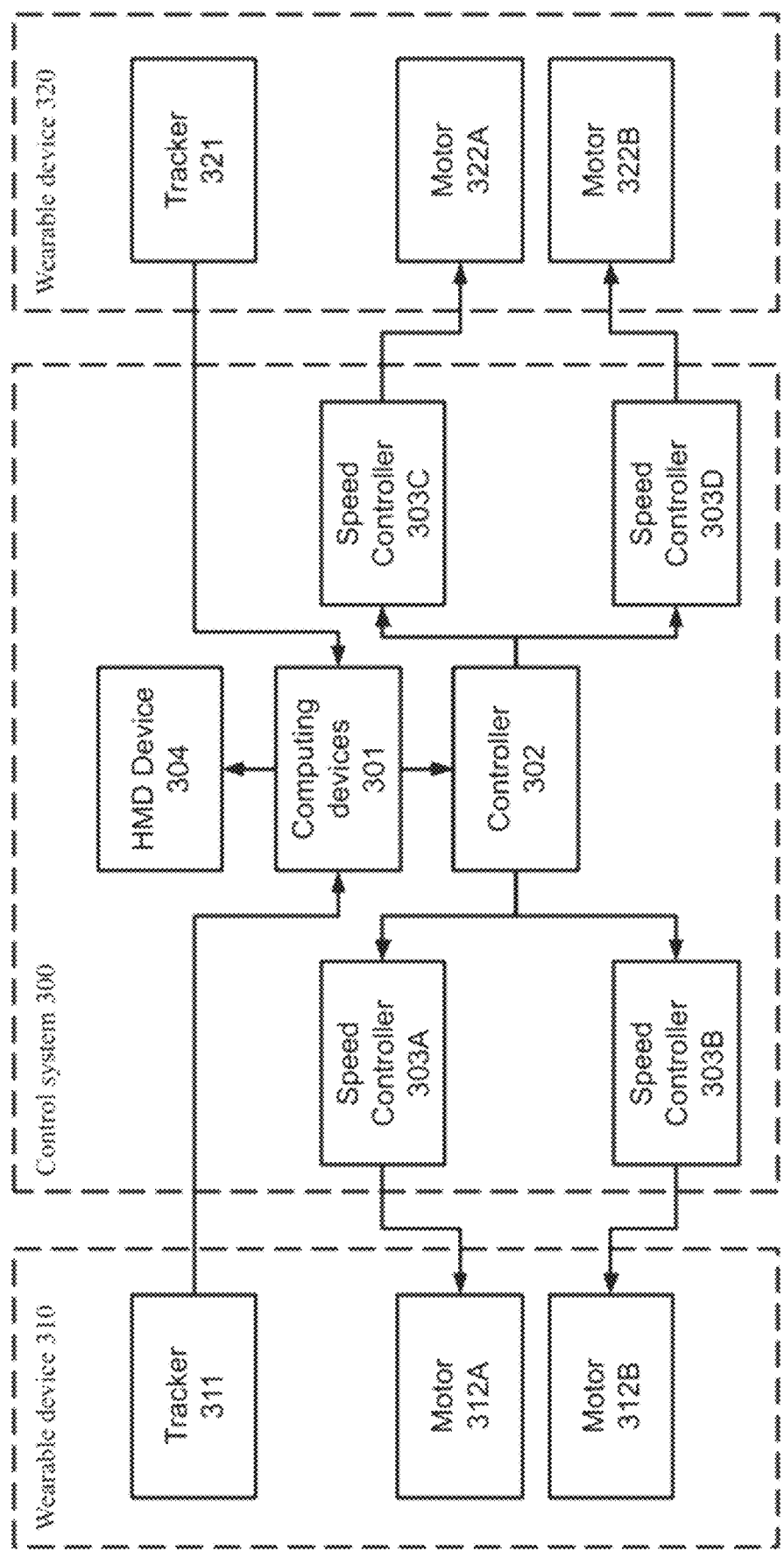
FIG. 3 depicts the connection between the control system and the wearable system in accordance with an embodiment of the present invention.

FIG. 3 illustrates the connection between the control system and the wearable system in accordance with an embodiment of the present invention. Control system 300 controls the force intensity generated by the ducted fans of wearable devices 310 and 320. Wearable devices 310 and 320 are similar to wearable device 100 as illustrated in FIG. 1. To simply describe the connection between control system 300 and wearable devices 310 and 320, only the component of wearable devices 310 and 320 connected with the component of Control system 300, i.e., the motors of the ducted fans and the tracker, will be shown in FIG. 3.

Control system 300 comprises computing device 301, controller 302, speed controllers 303A, 303B, 303C and 303D, and is externally connected to head mounted display (HMD) device 304.

As illustrated in FIG. 1, the calf-worn haptic system comprises a pair of wearable devices, such as wearable devices 310 and 320. Each of Wearable devices 310 and 320 comprises a pair of ducted fans, and each of the ducted fans comprises a motor. For example, wearable device 310 comprises motors 312A and 312B while wearable device 320 comprises motors 322A and 322B. Each of the motors is coupled to or connected to a speed controller of control system 300, wired or wirelessly.

For illustrative purposes, speed controllers 303A, 303B, 303C and 303D are wired connected with motors 312A, 312B, 322A and 322B respectively for controlling the duty cycle of motors 312A, 312B, 322A and 322B, and further control the speed.

Trackers 311 and 321 are wired or wirelessly connected with computing device 301, and a feedback signal is generated back to computing device 301. For illustrative purposes, trackers 311 and 321 are wirelessly connected with computing device 301. The speed of control will be explained hereafter in detail.

Computing device 301 may generate a simulation scene based on virtual reality three-dimensional engine software (Unity3D), the simulated scene may be generated according to the feedback data received from trackers 311 and 321. The feedback data may include but is not limited to one or more of the following: orientation, the position or the coordination of the trackers, and the velocity of the motion. The generated sense can be simulated through HMD device 304, such as the HTC VIVE™.

In one example, the virtual reality three-dimensional engine software may determine the coordinate of a player according to the orientation and the position of the trackers. If the orientation and the position of the trackers indicate that the player is in Forest A, then the scene of Forest A is generated and simulated/rendered through HMD device 304.

As illustrated in FIG. 2, each of the ducted fans may be mechanically or magnetically connected to the first external thread part of calf shell 101 through the connection component. To realize the rotation of the ducted fans through a predetermined angular amount, the connection components with the function of the mounting structure and angle adjustment are designed.

FIG. 4 illustrates the breakdown of the connection component in accordance with an embodiment of the present invention. Connection component 400 comprises first assembly 401 and second assembly 402. First assembly 401 and second assembly 402 are primarily coupled together by a screw nut 403, a pair of spring washer 404, and a pair of screw 405 through the threads of the first and second plates of the first assembly, and the first and second plates of the second assembly. Each of the first assembly and the second assembly are formed by a first plate, a second plate, and a third plate respectively. To perfectly couple the first assembly and the second assembly together, the first plate is perpendicularly placed on one edge of the third plate, and the second plate is perpendicularly placed at a position with a specific distance from another edge. The specific distance is the same as the thickness of the first plate. A thread is located on the first plate and the second plate respectively, and a circumferential groove is further located on one side of the thread of the first plate and the second plate for placing a spring washer. The diameter of the circumferential groove is larger than the diameter of the thread of the first plate and/or the second plate, which is the same as the diameter of the spring washer.

In one variant, a circumferential groove is located on both sides of the thread of the first plate or the second plate for placing a pair of spring washers and the screw nut respectively.

In one embodiment, the width of the first plate and the second plate are smaller than the width of the third plate. When placing the first plate and the second plate on the third plate, an L-shaped assembly is formed.

In another embodiment, the width of the first plate and the second plate are the same as the width of the third plate.

When coupling the first assembly and the second assembly together, a connection component is formed with a joint. The connection component may be the first connection component or the second connection component. The third plate of the first connection component and the third plate of the second connection component are horizontally aligned on the surface of the calf shell.

In order to allow the ducted fan mechanically connected to the calf shell through the connection component, at least two threads are located on the third plate of the first assembly and the third plate of the second assembly respectively. For illustrative purposes, the third plate of the first assembly is connected to the calf shell, and the third plate of the second assembly is connected to the ducted fan.

For example, to install first ducted fan 105 on calf shell 101 for generating an upward directed force, first ducted fan 105 is connected to the third panel of calf shell 101 through first connection component 103 if calf shell 101 is to be worn on the right side of the legs. The third plate of the first assembly or the third plate of the second assembly must be mechanically connected to the ducted fan or the calf shell by using screws.

There is no limitation that the third plate of the first assembly or the third plate of the second assembly must be mechanically connected to the ducted fan or the calf shell using screws. Any other mechanical mechanism or magnetic means may be used.

For example, the third plate of the second assembly further comprises two projection parts with a hexagonal shape, which have the same shape and size as each of the plurality of threads located on the first external thread part of calf shell 101.

The hexagonal shape is one of many possible polygonal shapes including, for example, squares, rectangles, triangles, and the like. By plugging two projection parts of the second assembly into two of the plurality of threads located on the first external thread part, plug and plug is achieved and the second assembly is connected to the calf shell. The same connection method may also be applied in between the ducted fan and the first assembly of the connection component.

In one variant, the third plate of the first assembly or the third plate of the second assembly may be magnetically connected to the ducted fan or the calf shell.

Therefore, the third plate of the first assembly and the third plate of the second assembly are coupled to the ducted fans and the calf shell respectively. By rotating and fastening the joint of the connection component, the angle between the ducted fan and the calf shell can be adjusted. For example, the angle of the airflow propagated direction of second ducted fan 104 and first ducted fan 105 may be adjusted through the configuration of first connection component 103 and second connection component 102 respectively as illustrated in FIG. 1.

Figure 5:
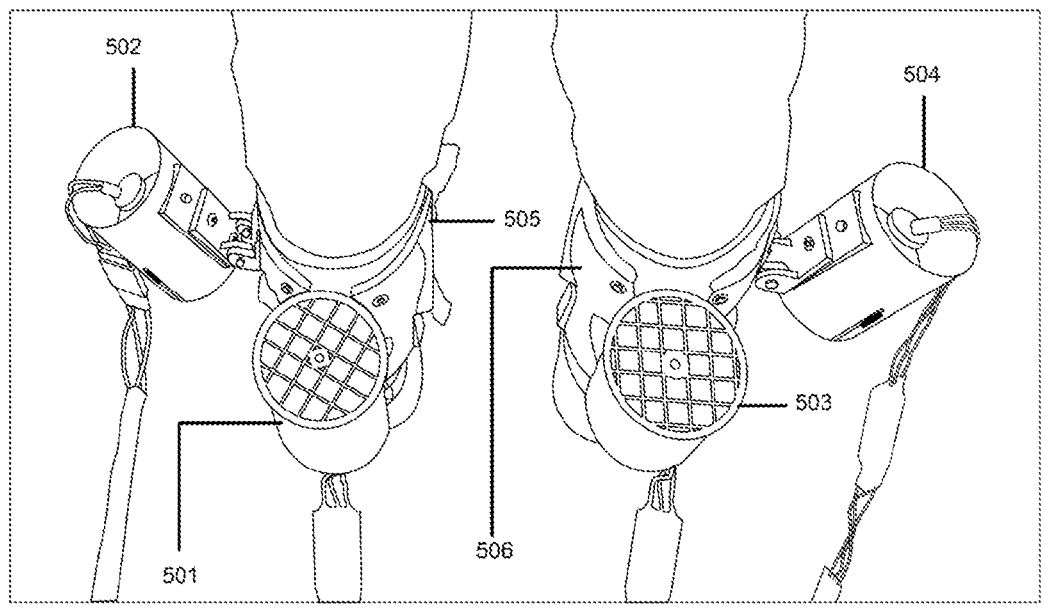
FIG. 5 depicts a pair of wearable devices to be worn on the left side and the right side of the legs.

In one embodiment, a pair of ducted fans are required to be installed on the calf shell through the connection components for providing an oppositive direction of forces. Therefore, the angle between the first ducted fan and the calf shell is adjusted in the range of 90 and 180 degrees such that the first ducted fan is in the first direction for generating a force in the first direction. At the same time, the angle between the second ducted fan and the calf shell is adjusted in the range of 0 and 90 degrees such that the second ducted fan is adjusted in the second direction for generating a force in the second direction. The first direction and the second direction are in the opposite direction. If the first direction is perpendicularly and towards the ground (0 degree), then the second direction is perpendicularly and away from the ground (180 degrees). The strongest airflow may be provided or be propagated. As illustrated in FIG. 5, the first ducted fan and the second ducted fan are installed on each of the wearable devices at 0 degree and 180 degrees respectively relative to a direction perpendicularly and towards the ground.

However, the user's walking actions, motions and experience may be affected by the strong wind that may directly blow towards the user's upper body.

In another embodiment, to provide a better user experience, the first direction may form an angle, such as 20 degrees, with the direction perpendicularly and towards the ground, while the second direction also forms the same angle, 20 degrees, with the direction away from the ground.

In one preferred embodiment, the angles formed between each of the first ducted fan and the second ducted fan with the calf shell are in the range of 20 and 30 degrees.

According to the feedback data, computing device 301 may further generate Pulse-Width Modulation (PWM) signals for controlling how much force should be outputted on each of the ducted fans of the wearable devices. The forces that the ducted fans outputted are for simulating the buoyancy and the resistive force when the human's lower limbs are interacting with different fluids and materials. While walking in the fluid in the real world, our legs usually undertake the resistive force whose direction would be always opposite to the direction of the leg calf movement. Meanwhile, there is also the buoyant force for the leg calf part that is immersed in the fluid. If the feedback data from the trackers indicate that the player may experience a fluid, such as water, then the buoyancy force ($\vec{F}_{BUOYANCE}$) and the resistive force ($\vec{F}_{RESISTANCE}$) that the user facing may be calculated. The calculation is performed by the computing device, such as computing device 301. A joint force may be calculated by combining the buoyant forces, the resistive forces, and potentially the weight of the medium as follow:

$$\vec{F} = \vec{F}_{RESISTANCE} + \vec{F}_{BUOYANCE} + \alpha \vec{G} \alpha \in \{0,1\}$$

The weight of the medium on the top of the foot is represented as $\vec{G}$ in the above equation. For the Newtonian fluid, no weight may be acted on the human foot. Therefore, $\alpha$ is zero for all Newtonian fluids. For the non-Newtonian fluid that tends to be solid in motion, the material may place a "solid" weight on the human foot. Therefore, $\alpha$ is zero for all non-Newtonian fluid.

The resistive force ($\vec{F}_{RESISTANCE}$) may be calculated from the following: a coefficient ($C_d$), the density of the simulated fluid ($\rho$), the cross-sectional area of the human's lower limb that facing fluid (S), and the velocity of the lifting leg calf ($v^2$). The resistive force may be obtained by performing a process that implements the following expression:

$$\vec{F}_{RESISTANCE} = \frac{1}{2}\rho C_d S v^2$$

The buoyant force ($\vec{F}_{RESISTANCE}$) may be calculated from the following: the density of the simulated fluid ($\rho$), the volume of the simulated fluid (V), and the gravitational acceleration. If the fluid is a Newtonian fluid, such as mud and sand, the buoyant force is zero. The buoyant force may be obtained by performing a process that implements the following expression:

$$\vec{F}_{BUOYANCY} = \rho V g$$

As mentioned above, the resultant force may be calculated by combining the buoyant forces, the resistive forces, and potentially the weight of the medium, the present invention uses a pair of ducted fans for each wearable device for simulating two different airflow directions respectively. One skilled in the art may be aware that two different airflow directions may be implemented by controlling the direction of one ducted fan, but it may cause significant latency when switching the airflow direction in one fan to provide bidirectional thrust. By using two ducted fans, low latency is demonstrated when changing the airflow force strength. Details of using two fans for achieving the reduction in latency will be discussed later in detail.

For illustrative purposes, each of the ducted fans in the present invention may generate a force up to 27N with a driven current of 70 A.

The force generated at each of the ducted fans may be controlled by the duty cycle of the motor, such as motors 312A, 312B, 322A and 322B, which is controlled by the speed controllers, such as speed controllers 303A, 303B, 303C and 303D, through the PWM signals.

There is no limitation on the maximum force generated by each of the ducted fans must be 27N, the maximum force generated by the motor of the ducted fan is varied by changing one or more of the following: the DC power source, the motor, and also the program that executed by the computing device.

Assuming that the other factors, such as the weight of the user, are remaining the same. Table 1 lists the densities, the values of the buoyancy force, the drag resistance force, the potential weight, and the joint forces of different fluids that the user may be facing:

TABLE 1

The physical properties of different materials and the related forces

| Material | Density | $\vec{F}_{BUOYANCY}$ | $\vec{F}_{RESISTANCE}$ | $\alpha \vec{G}$ | Joint force |
|---|---|---|---|---|---|
| Water | 1.000 | −12.70 | +2.34 | 0 | −10.36 |
| Air | 1.225 | −0.016 | +0.016 | 0 | 0 |
| Sand | 1442 | 0 | +3.37 | +16.96 | +20.33 |
| Mud | 1840 | 0 | +4.30 | +21.60 | +25.90 |

The resistive forces, the buoyant forces, the potential weights and the joint forces of different fluids listed in Table 1 may be calculated from the formula listed before. However, the actual force required to be generated by the pair of ducted fans is the generated force, which is the actual force generated by considering the required joint force and the net weight of the wearable device. If the net upward force is calculated, a negative sign is added before the magnitude. If the net downward force is calculated, a positive sign is added before the magnitude.

In one example, if the user is walking in water, the user may experience a buoyant force of −0.016, a resistive force of +2.34N, no potential weight, and resulting in a net joint force of −10.36N. After considering the net weight of the device, such as −12.5N, the generated force that the fans generated is −22.86N.

In another example, if the air is the only fluid that the user experiencing, the user may experience a buoyant force of −12.70N, a resistive force of +0.016N, no potential weight, and resulting in a net joint force of 0N. After considering the net weight −12.5N of the device, the generated force that the fans generated is −12.5N.

While walking in VR, the user may leave one kind of fluid and enter another, such as getting out of the water and stepping on the dry land or entering the water from the dry land. This requires the force-generation system to respond fast enough to provide real-time on-leg force feedback. Therefore, activating two ducted fans simultaneously is being introduced in the present invention for simulating the generated force in two different directions.

In the present invention, no matter whether the generated force is a net upward force or a net downward force, the generated force is simulated by the first ducted fan and the second ducted fan simultaneously for generating an upward force and a downward force simultaneously, instead of turning on the first ducted fan only or turning on the second ducted fan only. When there is a change in the generated force, the duty cycle of the motor of two activating ducted fans may change simultaneously, the system will mainly control the corresponding ducted fan to achieve the desired level, while maintaining another ducted fan spinning with the PWM signal of a non-zero level of the duty cycle, such as 4% duty cycle. Although each of the ducted fans may be operated in a duty cycle with the range of 0% to 100%, each of the ducted fans is operating in the duty cycle with the range of 4% to 100% in the present invention in order to maintain the activation of two ducted fans simultaneously. As a result, the acceleration time and the deceleration time are shortened when there is a force increasing or a force decreasing, and the user may experience a real-time speed adjustment without a noticeable delay.

In one experiment result, the response times are being measured by using the first ducted fan and the second ducted fan for generating an upward force and a downward force simultaneously. The PWM from 0% to 100% duty cycle is divided into 21 PWM inputs with an interval of 5% duty cycle. The average activation time for increasing the generated force among different duty cycles is 666 ms, and the average deactivation time for decreasing the generated force among different duty cycles is 1106 ms.

In another experiment result, if the PWM cycle is 5%, the activation time for increasing the generated force from 0N to a target force, such as 27N is 644 ms, and the deactivation time for decreasing the generated force from the target force to 0N is 827 ms.

In another experiment result, if the PWM cycle is 100%, the activation time for increasing the generated force from 0N to 27N is 844 ms, and the deactivation time for decreasing the generated force from 27N to 0N is 1267 ms.

In one embodiment, the direction of the generated force is unchanged when the generated force is changed. For example, the direction of the generating force remains unchanged when the generated force is changed from 10N to 16.17N.

In another embodiment, both the direction and the magnitude of the generated force are changed. For example, when a force of 16.17N is required to be generated, the computing system mainly controls the second ducted fan spinning with the PWM signal of 70% duty cycle for generating a downward force of 16.92N to achieve the desired level, while maintaining the first ducted fan spinning with the PWM signal of 4% duty cycle for generating a minimum upward force of 0.75N. If −16.17N is required to be generated in the next time, the computing system mainly controls the second ducted fan and reduces the duty cycle from 70% to 5% for generating a minimum downward force of 0.75N, while increasing the duty cycle of the first ducted fan from 5% to 70% for generating −16.92N upward force to achieve the desired level.

FIG. 5 illustrates a pair of wearable devices to be worn on the left side and the right side of the legs according to the embodiments of the present invention. Both first ducted fan and second ducted fan are connected to the outer surface of calf shell 101 of each of the wearable devices. As illustrated in FIG. 5, first ducted fan 501 and second ducted fan 502 are connected to calf shell 505, and first ducted fan 503 and second ducted fan 504 are connected to calf shell 506. First ducted fan 501, first ducted fan 503, second ducted fan 502 and second ducted fan 504 are similar to ducted fan 200 as illustrated in FIG. 2.

Figure 6:
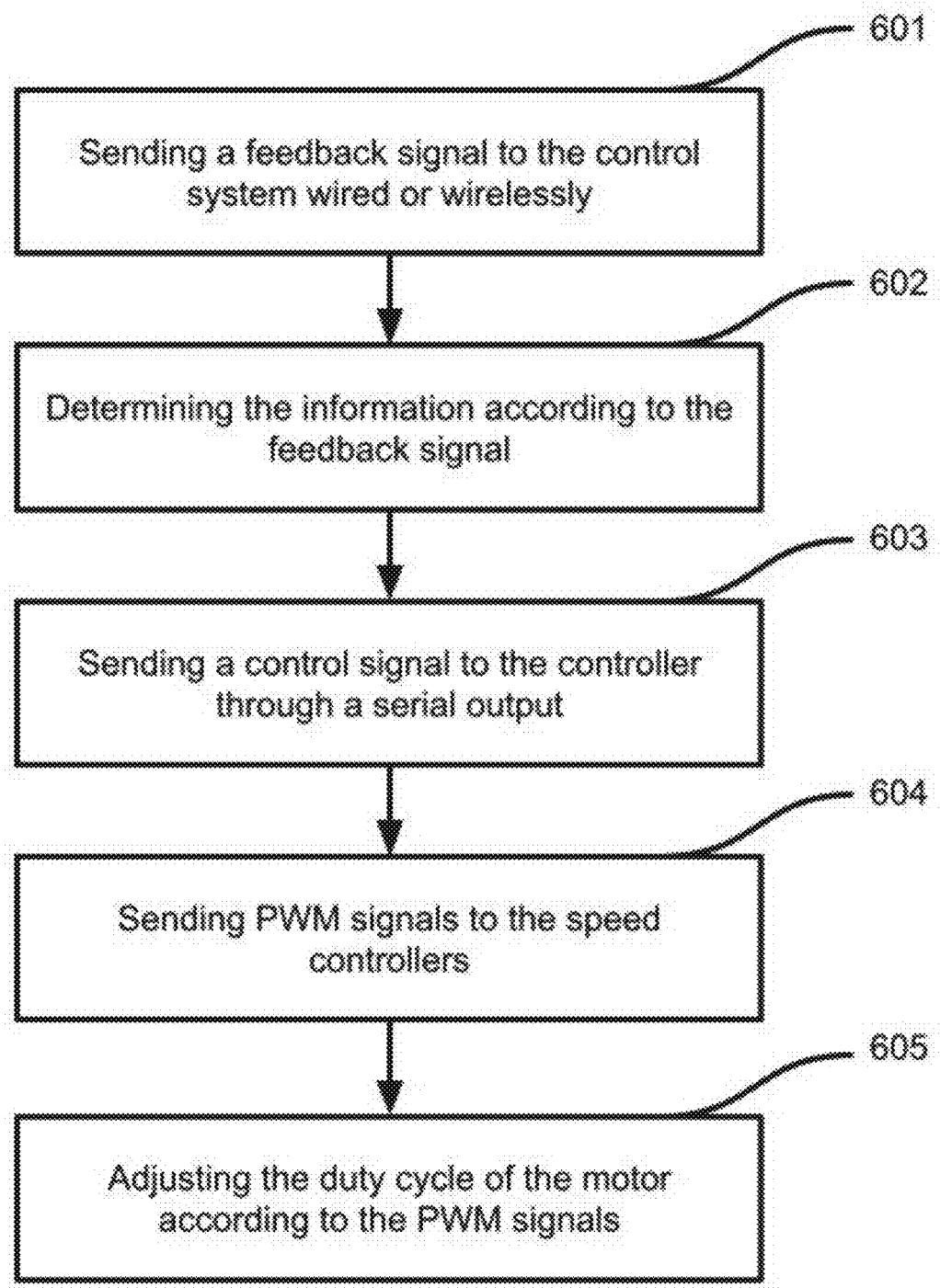
FIG. 6 depicts a flow diagram of the overall process between the calf-worn haptic system and the control system for simulating different fluid mediums that a user may experience in real-world walking.

FIG. 6 illustrates the overall process between the calf-worn haptic system and the control system for simulating different fluid mediums that a user may experience in real-world walking.

In process 601, at the tracker of each of the wearable devices, sends a feedback signal to the control system wired or wirelessly.

In process 602, at the computing device of the control system, determines the information according to the feedback signal. The information may include the coordination of the user, and also the medium or fluids that the user is experiencing.

In process 603, at the computing device of the control system, sending a control signal to the controller, such as Arduino UNO or Arduino MEGA, through a serial output. The control signal is transmitted from the serial port of the computing device to the serial port of the controller through an external communication bus, such as a Universal Serial Bus (USB), an RS-232 serial connection, a SCSI bus, a FireWire bus, a FireWire 800 bus, an Ethernet bus, a Gigabit Ethernet bus, or an Asynchronous Transfer Mode bus.

In process 604, at the controller of the control system, sends the PWM signals to the speed controllers of the control system when receiving the control signal from the computing device.

In process 605, at each of the speed controllers, receives the control signal from the controller and adjusts the duty cycle of the motor by supplying a corresponding current to the motors.

In one embodiment, the first plate, the second plate, the third plate, the ducted component, the blade propeller and/or the protection component are the 3D-printed parts. The materials used for the 3D-printed parts may be polylactic acid (PLA).

In another embodiment, the materials of the first plate, the second plate, the third plate, the ducted component, the blade propeller and/or the protection component is metal, such as copper or iron.

The functional units and modules of the system(s) in accordance with the embodiments disclosed herein may be implemented using computing devices, computer processors, or electronic circuitries including but not limited to application-specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the method(s) in accordance to the embodiments may be executed in one or more computing devices including server computers, personal computers, laptop computers, mobile computing devices such as smartphones and tablet computers.

The embodiments include computer storage media, transient and non-transient memory devices having computer instructions or software codes stored therein, which can be used to program or configure computing devices, computer processors, and/or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments may also be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A wearable device for simulating buoyancy and resistive force in virtual reality, comprising:
    a calf shell;
    a first ducted fan for generating a first force in a first direction by controlling the duty cycle of a first motor of the first ducted fan;
    a second ducted fan for generating a second force in a second direction by controlling the duty cycle of a second motor of the second ducted fan;
    a first connection component for connecting the calf shell and the first ducted fan;
    a second connection component for connecting the calf shell and the second ducted fan; and
    a tracker for transmitting a feedback data to a control system;
    wherein a sum of the first force and the second force being equal to a sum of the resistive force, the buoyancy, potential weights and a weight of the wearable device;
    wherein the first direction being different from the second direction; and
    wherein the first duty cycle and the second duty cycle being non-zero duty cycles.

2. The wearable device of claim 1, wherein the first motor and the second motor are high power brushless direct current (DC) motors.

3. The wearable device of claim 1, wherein the first ducted fan and the second ducted fan are mechanically or magnetically connected to the outer surface of the calf shell through the first connection component.

4. The wearable device of claim 1, wherein the non-zero duty cycle are in the range of 4% and 100%.

5. The wearable device of claim 1, wherein the first ducted fan and the second ducted fan are connected to the calf shell through the first connection component and the second connection component respectively.

6. The wearable device of claim 1, wherein the first direction and the second direction form a first angle and a second angle with a direction perpendicularly and towards a ground plane and a direction perpendicularly and away from the ground plane respectively.

7. The wearable device of claim 6, wherein the first angle and the second angle are varied by adjusting the first connection component and the second connection component respectively.

8. The wearable device of claim 7, wherein the first angle and the second angle are 0-degree angles.

9. The wearable device of claim 7, wherein the first angle and the second angle are 20-degree angles.

10. The wearable device of claim 1, wherein forces generated by each of the first ducted fan and the second ducted fan are limited to 27N.

11. A wearable system for simulating buoyancy and resistive force in virtual reality, wherein the wearable system comprises a pair of wearable devices, each of the wearable devices comprising:
    a calf shell;
    a first ducted fan for generating a first force in a first direction by controlling the duty cycle of a first motor of the first ducted fan;
    a second ducted fan for generating a second force in a second direction by controlling the duty cycle of a second motor of the second ducted fan;
    a first connection component for connecting the calf shell and the first ducted fan;
    a second connection component for connecting the calf shell and the second ducted fan; and
    a tracker for transmitting a feedback data to control system;
        wherein a sum of the first force and the second force being equal to a sum of the resistive force, the buoyancy, potential weights and a weight of the wearable device;
        wherein the first direction is different from the second direction; and
        wherein the first duty cycle and the second duty cycle are non-zero duty cycles.

12. The wearable system of claim 11, wherein the first motor and the second motor are high power brushless direct current (DC) motors.

13. The wearable system of claim 11, wherein the first ducted fan and the second ducted fan are mechanically or magnetically connected to the outer surface of the calf shell through the first connection component.

14. The wearable system of claim 11, wherein the non-zero duty cycle are in the range of 4% and 100%.

15. The wearable system of claim 11, wherein the first ducted fan and the second ducted fan are connected to the calf shell through the first connection component and the second connection component respectively.

16. The wearable system of claim 11, wherein the first direction and the second direction form a first angle and a second angle with a direction perpendicularly and towards a ground plane and a direction perpendicularly and away from the ground plane respectively.

17. The wearable system of claim 16, wherein the first angle and the second angle are varied by adjusting the first connection component and the second connection component respectively.

18. The wearable system of claim 17, wherein the first angle and the second angle are 0-degree angles.

19. The wearable system of claim 17, wherein the first angle and the second angle are 20-degree angles.

20. The wearable system of claim 11, wherein forces generated by each of the first ducted fan and the second ducted fan are limited to 27N.

* * * * *